US008942675B2

(12) United States Patent
Collins et al.

(10) Patent No.: US 8,942,675 B2
(45) Date of Patent: Jan. 27, 2015

(54) SYSTEM, APPARATUS AND ASSOCIATED METHODOLOGY FOR ENRICHING CONTACT OF A REMOTE CLIENT

(75) Inventors: Tim Collins, Helsinki (FI); Lionel Wolovitz, Lymington (GB); Siavash James Joorabchain Hawkins, Tonbridge (GB)

(73) Assignee: Good Technology Corporation, Dover, DE (US)

( * ) Notice: Subject to any disclaimer, the term of this patent is extended or adjusted under 35 U.S.C. 154(b) by 19 days.

(21) Appl. No.: 12/554,428

(22) Filed: Sep. 4, 2009

(65) Prior Publication Data

US 2010/0144323 A1    Jun. 10, 2010

Related U.S. Application Data

(60) Provisional application No. 61/094,450, filed on Sep. 5, 2008.

(51) Int. Cl.
*H04M 3/42*        (2006.01)
*G06Q 10/10*       (2012.01)

(52) U.S. Cl.
CPC ..................................... *G06Q 10/10* (2013.01)
USPC ........................................ 455/414.1; 370/338

(58) Field of Classification Search
CPC ......................... H04M 2203/655; H04L 51/32
USPC .............................. 455/414; 348/14.01–14.07
See application file for complete search history.

(56) References Cited

U.S. PATENT DOCUMENTS

| | | |
|---|---|---|
| 6,735,292 B1 | 5/2004 | Johnson |
| 7,756,811 B2 | 7/2010 | Cohen et al. |
| 2003/0222765 A1 | 12/2003 | Curbow et al. |
| 2004/0243677 A1 | 12/2004 | Curbow et al. |
| 2004/0264660 A1 | 12/2004 | McCullough et al. |
| 2005/0289180 A1 | 12/2005 | Pabla et al. |
| 2006/0085419 A1 | 4/2006 | Rosen |
| 2006/0209690 A1 | 9/2006 | Brooke |
| 2006/0224675 A1 | 10/2006 | Fox et al. |
| 2007/0070940 A1 | 3/2007 | Vander Veen et al. |

(Continued)

FOREIGN PATENT DOCUMENTS

| | | |
|---|---|---|
| GB | 2 441 399 A | 3/2008 |
| GB | 2441399 | 3/2008 |

(Continued)

OTHER PUBLICATIONS

International Preliminary Report on Patentability issued Mar. 18, 2011, in International Application No. PCT/US09/55962 (International filing date Sep. 4, 2009).

(Continued)

*Primary Examiner* — Marcos Batista
(74) *Attorney, Agent, or Firm* — EIP US LLP

(57) ABSTRACT

A contact enrichment system is provided to determine whether contacts stored in a mobile device match profiles stored on a social network server. Profiles matching the contacts are used to enrich the contacts by appending information such as images and video to the contacts. The appended information in the contacts are also linked to the source profile so that the contact information may be periodically updated. Information may be drawn from multiple profiles on multiple social network servers to fully enrich the contacts stored on the mobile device.

27 Claims, 11 Drawing Sheets

(56) References Cited

U.S. PATENT DOCUMENTS

| | | | |
|---|---|---|---|
| 2007/0276795 A1* | 11/2007 | Poulsen | 707/2 |
| 2007/0281689 A1 | 12/2007 | Altman | |
| 2008/0080689 A1 | 4/2008 | Casalaina et al. | |
| 2008/0152097 A1 | 6/2008 | Kent | |
| 2008/0205655 A1 | 8/2008 | Wilkins et al. | |
| 2009/0054039 A1 | 2/2009 | van Wijk et al. | |
| 2009/0110156 A1* | 4/2009 | Hosteny et al. | 379/85 |
| 2009/0228555 A1 | 9/2009 | Joviak et al. | |
| 2010/0015976 A1* | 1/2010 | Issa et al. | 455/435.1 |
| 2010/0030788 A1 | 2/2010 | Chen et al. | |
| 2013/0002427 A1 | 1/2013 | Bocking et al. | |

FOREIGN PATENT DOCUMENTS

| | | |
|---|---|---|
| WO | 2008027965 | 3/2008 |
| WO | WO 2008/103326 A1 | 8/2008 |

OTHER PUBLICATIONS

Supplementary European Search Report issued May 2, 2012, in European Patent Application No. EP 09 81 2250.

International Search Report mailed May 29, 2012 in PCT/EP2012/052353.

Office Action mailed May 16, 2013 in co-pending U.S. Appl. No. 13/034,493.

Office Action mailed Dec. 6, 2012, in co-pending U.S. Appl. No. 13/034,493.

* cited by examiner

Figure 4

| | Name 310 | Phone 320 | Address 330 |
|---|---|---|---|
| 340 | John Smith | 111-1111 | 123 Elm Ave. |
| 350 | Jane Doe | 222-2222 | 456 Oak St. |
| 360 | David Jones | 333-3333 | 789 Ash Ct. |
| | | | |
| | . . . | . . . | . . . |

| | Name 410 | Phone 420 | Email 430 | Image 440 | Posts 450 |
|---|---|---|---|---|---|
| 460 | Paul Smith | 444-4444 | paul@net.net | Paul.jpg | Mssg.txt |
| 470 | Fred Johns | 555-5555 | fred@net.net | Fred.jpg | Mssg.txt |
| 480 | John Smith | 111-1111 | js@net.net | John.jpg | Mssg.txt |
| 490 | John Smith Jr. | 666-6666 | jsj@net.net | JohnJr.jpg | Mssg.txt |
| | . . . | . . . | . . . | . . . | . . . |

400

| Contact ID 1010 | Contact Path 1020 | Profile ID 1040 | Profile Path 1050 |
|---|---|---|---|
| John Smith | Mobile 1 | js@net.net | URL |
| . | . | . | . |
| . | . | . | . |
| . | . | . | . |

1000

1060

SYSTEM, APPARATUS AND ASSOCIATED METHODOLOGY FOR ENRICHING CONTACT OF A REMOTE CLIENT

CROSS-REFERENCE TO RELATED APPLICATIONS

The present application is based upon and claims the benefit of priority from U.S. provisional Application No. 61/094,450 entitled "System and Associated Methodology of Enriching Contacts of a Remote Client", filed on Sep. 5, 2008, the entire contents of which are incorporated herein by reference.

BACKGROUND

The present advancements relate to a system, apparatus and associated methodology for updating contact information in mobile devices, such as cell phones, smart phones and personal digital assistants (PDA's).

Many mobile devices, such as cell phones, smart phones and PDA's store contacts for quick access to phone numbers, postal addresses and even email addresses corresponding to people and/or business with which communication is frequently performed. Contact information may be organized within mobile devices by an address book, or other such application, according to a user-defined setting, such as alphabetically or based on predefined social, work and/or school groups.

Early mobile devices stored only text-based contact information, such as names, address, phone numbers and other such text-based information. However, modern mobile devices may also store multimedia information, including images, video and audio, as part of a contact. When receiving a call, a mobile device may display, for example, a picture of the caller that has been stored as part of the contact information corresponding to the incoming call. The mobile device may even play an audio clip corresponding to the contact as the ringtone for the incoming call.

However, for the mobile device to make use of contacts stored thereon, the contact information must be manually created and managed. This may involve manual entry of phone numbers, addresses, email addresses and multimedia content. Further, entry of multimedia content into a contact may require downloading the content from a camera or other source into a computer, formatting the content to be compatible with the mobile device, and downloading the content to the mobile device. Thus, creating new contacts or appending new information to existing contacts on a mobile device requires a high degree of interaction between the mobile device and its user, making the process tedious.

The contacts of a mobile device may be synchronized with contacts stored on a computer or other device. In synchronization, the mobile device exchanges contact information with, for example, a computer such that both the mobile device and the computer have the same contact information. Synchronization allows for contact entry on a computer, which has a larger keyboard better suited to data entry, but still requires manual entry of all data and any updates or additions thereto.

Recently, social networking sites establishing new ways of communication have emerged on the Internet. Users of these social networking sites may exchange emails, photographs, video, instant messages, and the like. Each user of the social networking site may also identify other users as "friends" with which to communicate and share information, provided the other users consent to the "friendship." Once established, friendships allow users access to each other's profile information, which may include multimedia content, such as images, audio and video, as well as messages posted by friends to others or to groups.

Further, when a user first joins a social networking site, the user may fill out a profile including personal information. Such profiles are then used by other users to determine whether they share interests, location, or to gain general background information. Profiles may also be used by the social networking site itself to relay messages to, for example, an email address of the user. As these profiles include such basic information as name, email address, postal address, phone number, images, video, audio, and may even include postings and/or messages created by the user, and any responses thereto, a social networking site profile includes information that may be applicable to contacts stored on a mobile device.

SUMMARY

In view of the foregoing, the present advancements provide a system for enriching contact information stored on a mobile device using profile information stored on, for example, a social networking site.

Thus, the present disclosure provides a content enrichment system that includes a social network server connected to a network and that stores a plurality of profiles in relation to a plurality of accounts. A mobile device that stores a plurality of contacts is also provided. A contact enrichment server connected to the network searches at least one account on the social network server for a matching profile that corresponds to at least one of the contacts stored on the mobile device. The contact enrichment server then appends information from the matching profile to the at least one contact.

In another aspect of the present advancement, the contact enrichment server links the information appended to the at least one contact to corresponding information in the matching profile. The contact enrichment server stores the link between the appended information and the corresponding information in the matching profile in a link table, and updates the information appended to the at least one contact using the link table when the corresponding information in the matching profile changes.

Other objects, features, and advantages of the present disclosure will be fully understood from the following detailed description of exemplary embodiments of the invention when in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by this specification and drawings are defined by the words of the accompanying claims.

FIG. 4 is a table of exemplary contact information stored on a mobile device according to an exemplary embodiment of the present disclosure;

FIG. 5 is a table of exemplary information stored in a profile on a social networking server according to an exemplary embodiment of the present disclosure;

DETAILED DESCRIPTION

In the description the term "contact" as used herein refers to electronic information pertaining to a person or entity that is stored on the mobile device (or a client device.) The term "profile" is used to refer to a collection of information pertaining to a user that is stored on a social networking site, other remote site or client device. The present disclosure also describes the entire group of contacts as the "address book."

Figure 1:
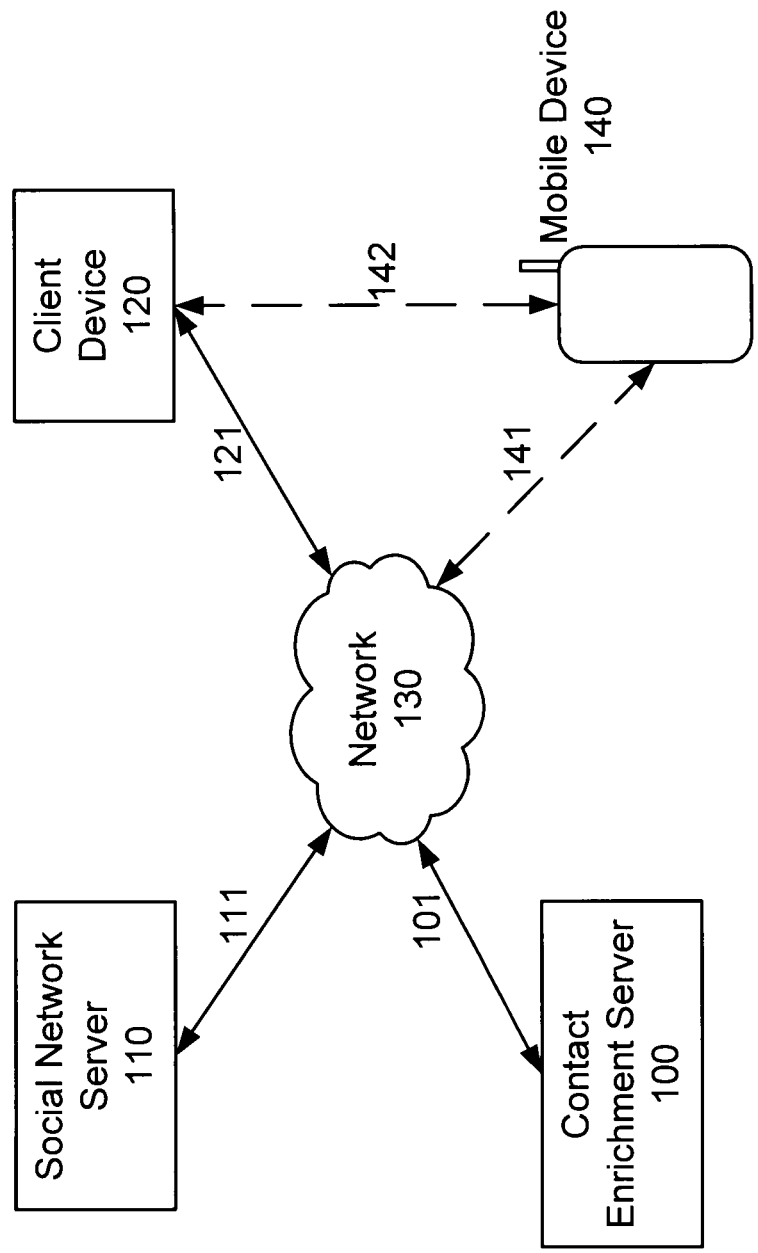
FIG. 1 is a block diagram of the contact enrichment system according to an exemplary embodiment of the present disclosure.

FIG. 1 is a diagram of the system for contact enrichment according to an exemplary embodiment of the present disclosure. In FIG. 1, a contact enrichment server 100, social network server 110, client device 120 and mobile device 140 are interconnected by network 130.

Network 130 may be, for example, a wide area network (WAN), a wireless wide area network (WWAN) or a circuit-switched telephone network, such as an Integrated Services Digital Network (ISDN). The network 130 may also be a public network such as the Internet, a hybrid network (partly public and partly private) or a dedicated network. If the network 130 is wireless, radio network access can include Global System for Mobile Communication (GSM), General Packet Radio Services (GPRS), Enhanced Data GSM Environment (EDGE), Code Division Multiple Access (CDMA), 3G, 4G and the like. Other networks, whose descriptions are omitted here for brevity, may also be used in conjunction with the system of FIG. 1 without departing from the scope of the present advancement.

The social network server 110 stores user profiles and accounts is connected to the network 130 via connection 111, which may be wired or wireless as discussed above. The client device 120 may also be connected to the network 130 via a connection 121 that is either wireless or wired. The client device 120 may be used to manage the account and/or profile information on the social network server 110, and may be, for example, a personal computer. The client device 120 may also manage information stored in the contact enrichment server 100 and the mobile device 140, as will be explained below.

Mobile device 140 is connected to the client device 140 through link 142. Mobile device 140 may be a smart phone, such as the iPhone manufactured by Apple, Inc. of Cupertino, Calif., U.S.A. Link 142 may be a wired link, such as a USB link, or a wireless link such as a cellular phone communication medium, WiFi or Bluetooth. The mobile device 140 may also be directly connected to the network via link 141 which may be any one of a Bluetooth connection, WIFI connection or a cellular connection. As the mobile device 140 may be connected to the network 130 via the client device 120 or directly via connection 141, connection 141 and link 142 are shown in dashed lines to indicate that one or the other may be omitted.

The contact enrichment server 100 is also connected to network 130 through link 101, which may be wired or wireless. The contact enrichment server 100 includes information regarding the accounts and profiles stored in the social network server 110, as well as information identifying the mobile device 140. Thus, the contact enrichment server 100 has access to both the profiles stored on the social network server 110 and contacts stored on mobile device 140.

In an exemplary embodiment, a web front end is provided to present a graphical user interface (GUI). The contact enrichment server 100 employs a windows based operating system, however alternative operating systems may include but are not limited to Unix, Solaris, Linux, as well as Apple MAC-OS. Thus, the contact enrichment server 100 provides the front end for connection to the network such as the Internet. In the exemplary embodiment, the contact enrichment server 100 employs Microsoft® Windows 2000 Server IIS, Active Directory, and FTP, and may also employ Microsoft® Windows 2000, COM and DOT net services, as well as Microsoft® Windows 2000 MS SQL for interfacing, searching and storing profile and contact information.

Further, the contact enrichment server 100 may be housed within a single device or may be implemented separately on FPGA's, ASIC's, microcontrollers, PLD's or other computer-readable mediums such as an optical disk. Contact enrichment server 100 may also be implemented in a distributed architecture including multiple devices having, for example, the structure of FIG. 2. As is recognized by one skilled in the art, the above description of the contact enrichment server is applicable to the social network server 110.

One of skill in the art will recognize that the contacts may also be stored on client device 120, or the contacts may be shared between client device 120 and mobile device 140. In addition, client enrichment server 100 may store a copy of the contacts. Thus, the present advancements are equally applicable to enrichment of contacts on the mobile device 140, client device 120 and/or contact enrichment server 100. Those skilled in the art will also recognize that multiple contact enrichment servers 100, social network servers 110, client devices 120 and mobile devices 140 may form part of the system in FIG. 1 without departing from the scope of the present invention.

The contacts stored on the mobile device 140 may be organized alphabetically, according to groups, frequency of contact, or the like. The contacts in the mobile device 140 may also be stored in an address book application for ease of management and organization. Copies of the address book may exist on the client device 120 and/or the contact enrichment server 100 as described above. Alternatively, only mobile device 140 stores the contacts and/or address book, and the client device 120 merely serves as a conduit for transmitting information pertaining to the contacts stored on the mobile device 140 to/from the contact enrichment server 100.

Figure 2:
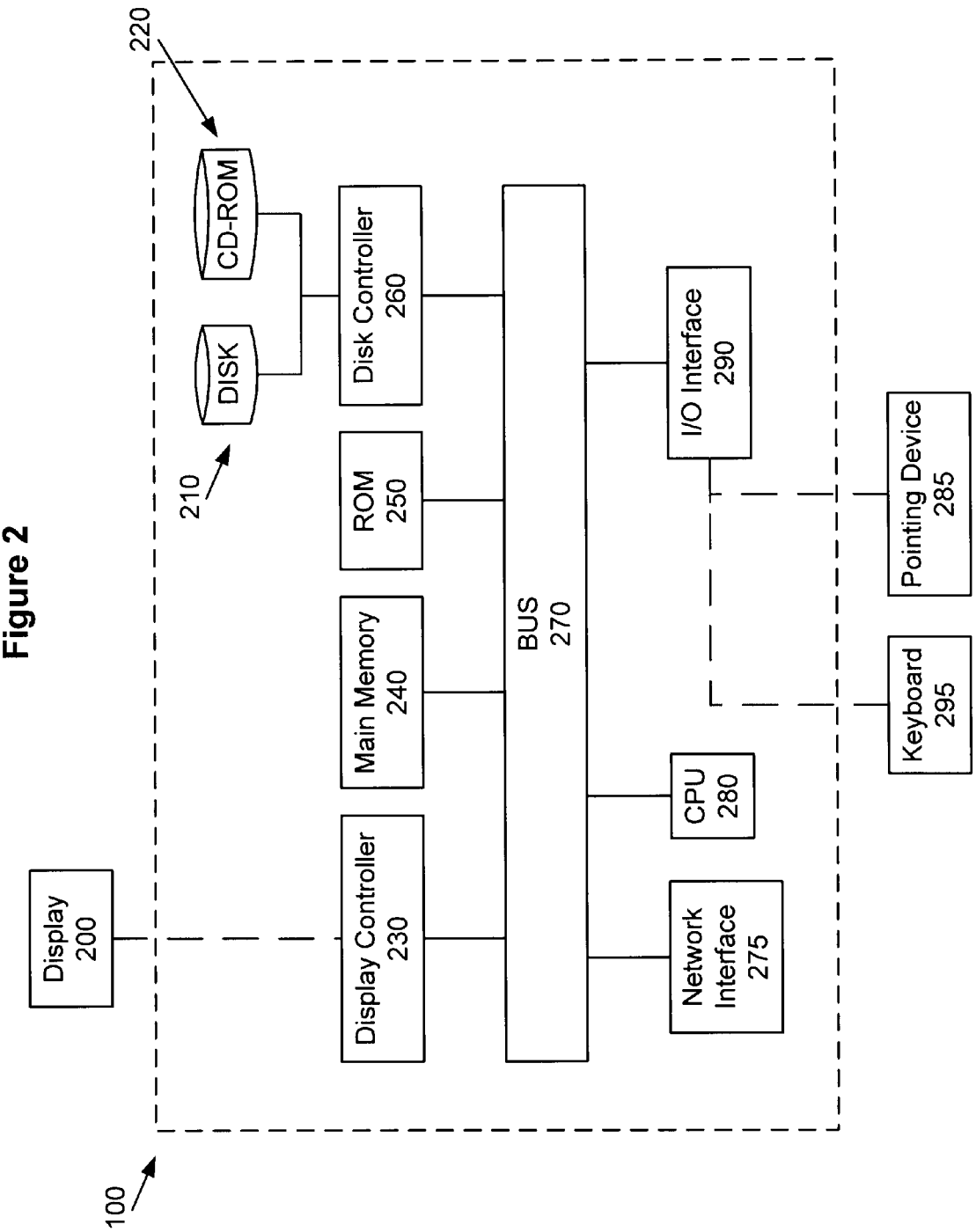
FIG. 2 is a block diagram of a contact enrichment server according to an exemplary embodiment of the present disclosure.

FIG. 2 is a block diagram of the contact enrichment server 100. The contact enrichment server 100 includes a CPU 280 which processes data and instructions stored in main memory 240 and/or ROM 250. The CPU 280 may also process information stored on the disk 210 or CD-ROM 220. The exemplary CPU 280 may be an IBM System X from IBM of America employing at least one Xenon processor from Intel of America or an Opteron processor from AMD of America. Thus, instructions corresponding to a process for contact enrichment in a mobile device may be stored on any one of the disk 210, CD-ROM 220, main memory 240 or ROM 250.

The contact enrichment server 100 also includes a network interface 275, such as a an Intel Ethernet PRO network interface card from Intel Corporation of America, for interfacing with the network 130; a display controller 230, such as a NVIDIA GeForce GTX graphics adaptor from NVIDIA Corporation of America for interfacing with a display 200, such as a Hewlett Packard HP L2445w LCD monitor. The contact enrichment server 100 may also include an I/O interface 290 for interfacing with a keyboard 295 and pointing device 285, such as a roller ball or mouse. Disk controller 260 interconnects disk 210, such as a hard disk drive or FLASH memory drive, and CD-ROM 220 or DVD drive with bus 270, which may be an ISA, EISA, VESA, PCI, or similar for interconnecting all of the components of the contact enrichment server 100. A description of the general features and functionality of the display 200, keyboard 295 and pointing device 285, as well as the display controller 230, disk controller 260, network interface 275 and I/O interface 290 is also omitted for brevity as these features are well known. Of course, other processor and hardware vendors and types are known in the art such as Freescale ColdFire, i.MX and ARM processors from Freescale Corporation of America.

The exemplary contact enrichment server of FIG. 2 is therefore a hardware platform of a computing device, such as a PC, and CPU 280 may for example be an Intel Pentium Processor, or any other processor known in the art. The computer-readable instructions stored on any one of the main memory 240, ROM 250, disk 210 or CD-ROM 220 may be provided as a utility application, background daemon, or component of an operating system, or combination thereof, executing in conjunction with CPU 280 and an operating system such as Microsoft VISTA, UNIX, Solaris, LINUX, Apple MAC-OS and other systems known to those skilled in the art.

Main memory 240 and/or ROM 250 supports registries and the like features of the contact enrichment server 100. As such, main memory 240 may be a random access memory (RAM), FLASH memory, EEPROM memory, or the like, while ROM 250 is Read Only Memory, such as PROMs. Further descriptions of the main memory 240 and the ROM 250 are omitted for brevity as such memory is well known.

Figure 3:
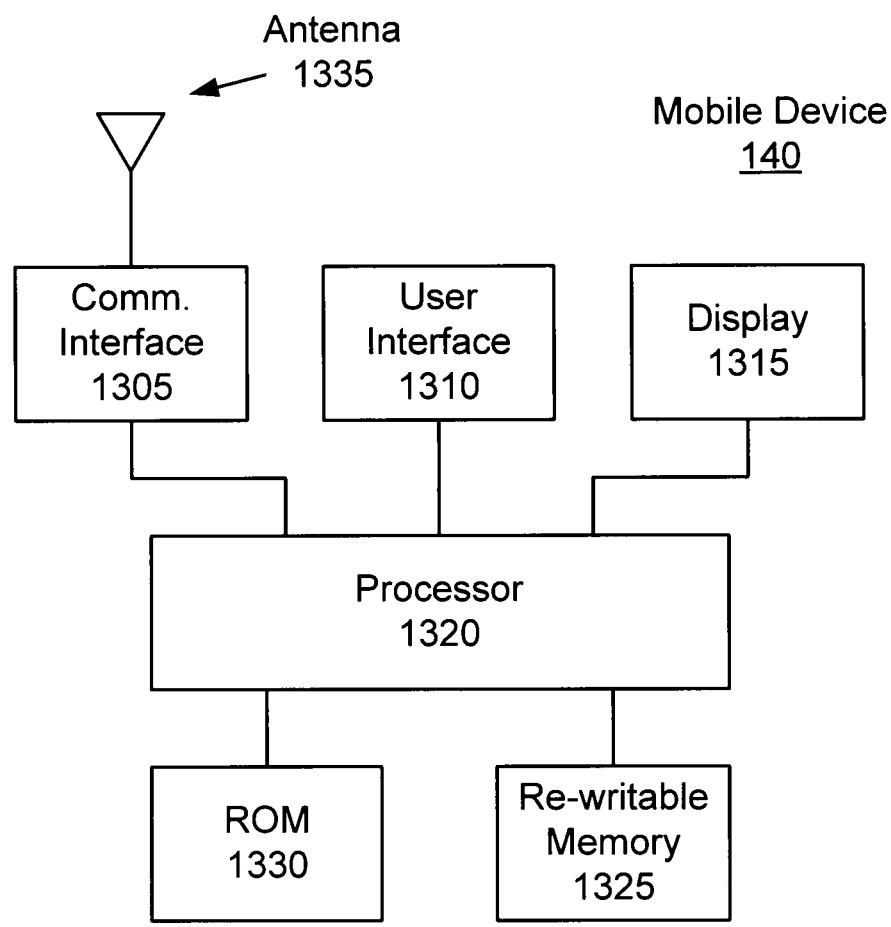
FIG. 3 is a block diagram of a mobile device according to an exemplary embodiment of the present disclosure.

FIG. 3 is a block diagram of a mobile device 140 according to an exemplary embodiment of the present disclosure. Mobile device 140, which may be a smart phone such as an iPhone from Apple, Inc. of America, includes a processor 1320 used to control the functions of mobile device 140 and to run applications thereon, such as an electronic address book, interne browser, etc. Processor 1320 may be an ARM processor or a processor such as a Core 2 Duo from Intel Corporation of America. Alternatively, Processor 1320 may be implemented on an FPGA, ASIC or using discrete logic circuits, as one of ordinary skill will recognize.

A user interface 1310, which may include a microphone, speaker, touch screen, keyboard or any combination thereof, allows the processor 1320 to receive input from a user of the mobile device 140, and a display 1315 provides feedback to the user. Display 1315 may be a color or monochrome LCD display or any other display that is known.

Mobile device 140 also includes a communication interface 1305 and antenna 1335 to communicate with other devices, such at the contact enrichment server 100, social network server 110, client device 120 or another mobile device 140. Further, mobile device 140 may communicate with these other devices wirelessly using the cellular network (including EDGE, 3G, 4G, etc.,) a WiFi connection, a Bluetooth connection or any other wireless form of communication that is known. Mobile device 140 may also communicate through a wired connection to communication interface 1305, such as a USB connection.

Mobile device 140 includes read-only memory, ROM 1330, to store low-level functions and processes necessary to support core functionality, and re-writable memory 1325, which stores an operating system, drivers, applications, application data and user data. Re-writable memory 1325 may be dynamic or static random access memory (RAM), FLASH memory, EEPROM memory, and the like. Further, portions of the re-writable memory 1325 may be removable.

For example, re-writable memory 1325 may store an application for communicating with contact enrichment server 100 to identify mobile device 140 and to provide the contact enrichment server 100 with access to contacts stored therein. Such application may be downloaded, via any of the communication methods described above, from the contact enrichment server 100, from a software repository or from an online store, such as the App Store from Apple, Inc. of America. Further, such an application may be an electronic address book, or electronic personal information manager (PIM). However, the application may also be a plug-in for an electronic address book or PIM already installed on mobile device 140, a background application, driver and the like.

As one of skill in the art would recognize, the above descriptions of the contact enrichment server 100 and mobile device 140 are merely exemplary and other server configurations and mobile devices may be used without departing from the scope of the present advancements. Further, client device 120 and social network server 110 may include similar structures as the contact enrichment server 100. Thus, the above description of the hardware features for the contact enrichment server 100 may be equally applicable to the social network server 100 and client device 120.

FIG. 4 includes contacts 300 stored on the mobile device 140. Exemplary, contacts 300 include three entries, contacts 340, 350 and 360. However, one of skill in the art will recognize that the number of contacts 300 stored in mobile device 140 is limited only by the memory capacity and user preferences of mobile device 140.

Each exemplary contact 300 includes a name 310, phone 320 and address 330 entry. For example, contact 340 has a name 310 of "John Smith", a phone 320 of "111-1111" and an address 330 of "123 Elm Ave". However, other entries, such as email addresses, Instant Messaging Identifiers (IN ID's), images, ringtones, audio files, video files, messages, calendar events, etc., are embraced by this description.

FIG. 5 includes profiles 400 stored on the social network server 110. While large numbers of profiles are stored in social network server 110, respective ones of profiles 400 are associated with an individual user account. Each exemplary profile 400 includes name 410, phone 420, email 430, image 440 and posts 450 entries associated therewith. For example, the profile 460 has a name 410 of "Paul Smith", a phone 420 of "444-4444", an email 430 of "paul@net.net", an image 440 of "paul.jpg" and a post 450 of "mssg.txt". As with contacts 300, profiles 400 are merely exemplary and additional information may populate the profiles 400 as noted above.

Exemplary profiles 400 may include audio files in a variety of audio formats, such as MP3, WAV, PCM, APE, ATRAC, AIFF, AAC, etc., and video files in such formats as MPEG, AVI, MOV, etc. Although, images in profiles 400 have a ".jpg" extension corresponding to JPEG images, other image formats are known, such as TIFF, GIF, BMP, etc. Even the textual entries may be in any format known in the art, such as TXT, RTF, DOC, etc. As such, exemplary profiles 400 are presented in a simple form herein to tautological purposes only.

The contact enrichment server 100 has access to both contacts 300 and profiles 400 and is therefore able to enrich contacts 300 with information from profiles 400 as discussed below with reference to FIGS. 6-8.

Figure 6:
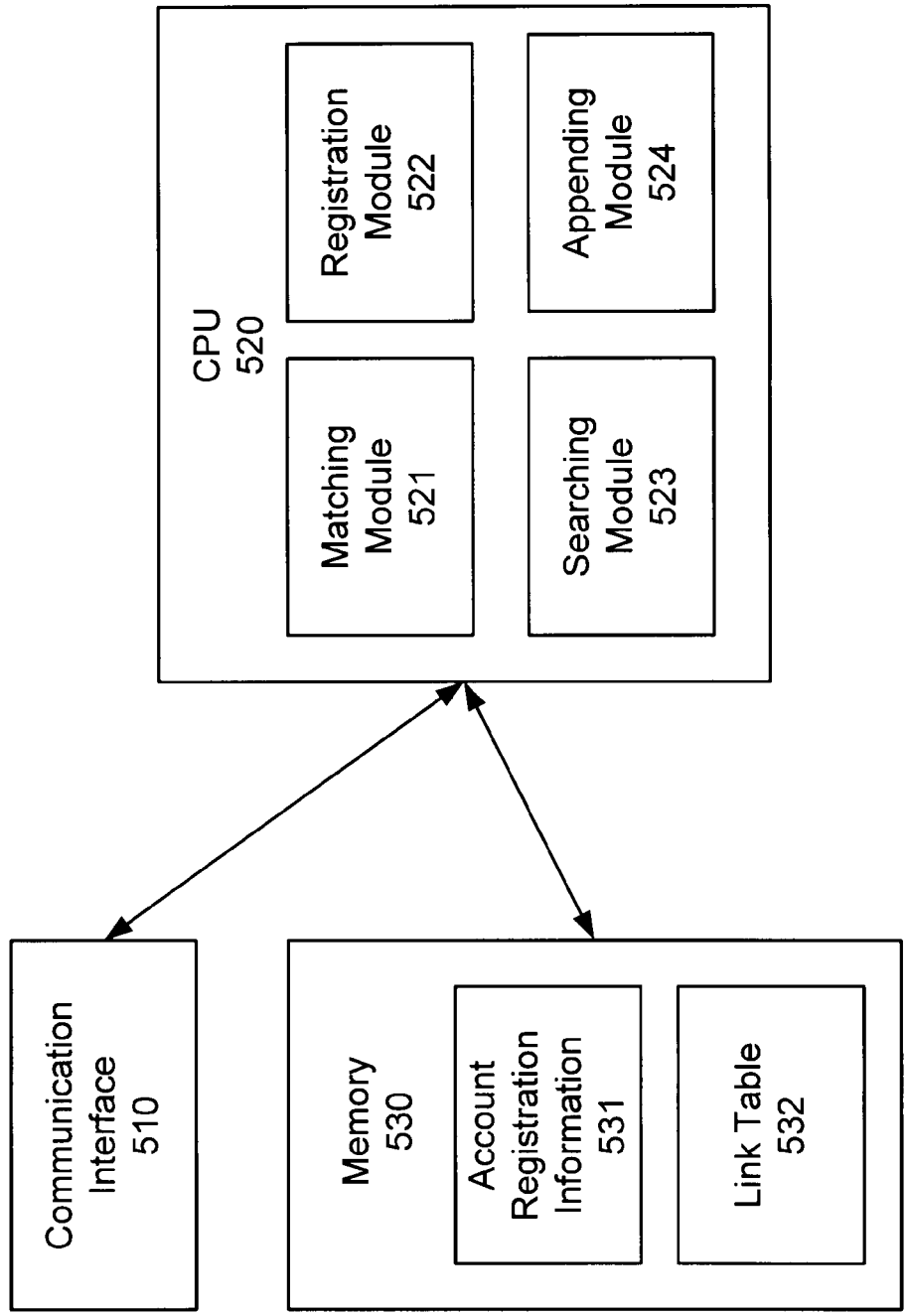
FIG. 6 is a functional diagram of the contact enrichment server according to an exemplary embodiment of the present disclosure.

FIG. 6 is a functional block diagram of the contact enrichment server 100 according to an exemplary embodiment of the present disclosure. In FIG. 5, CPU 520 of the contact enrichment server 100 includes a registration module 522 used to register user social networking accounts and mobile device(s) 140; a searching module 523 used to search the profiles 400 for profiles matching the contacts 300 stored on the mobile device 140; a matching module 521 used to match the profiles 400 to at least one contact 300; and an appending module 524 used to append information from the profiles 400 to the contacts 300.

Modules 521, 522, 523 and 524 identify functionality of an application run by CPU 520 rather than independent tasks. As such, the functionality of modules 521-524 may be implemented as an application or background daemon, or may be integrated into one of the operating systems described above.

The contact enrichment server 100 of FIG. 6 also includes a communication interface 510 used to communicate to the social network server 110, the mobile device 140 and the client device 120 through network 130. Memory 530 includes account registration information 531 in which the registration module 522 registers information identifying user accounts on the social network server 110 and the mobile device 140. Memory 530 also includes link table 532 to store information linking information appended to contacts 300 with corresponding information the profiles 400. Thus, the contact enrichment server 100 may use the link table 532 to update the appended information in contacts 300, as discussed in detail below.

Next, an overview of the contact enrichment process performed by the collective modules of contact enrichment server 100 is described with reference to FIGS. 7-10. Those skilled in the art will recognize FIGS. 7-10 as providing the algorithmic detail necessary to implement modules 521-524 of the contact enrichment server 100 in code. Of course, the specific choice of coding language is within the discretion of a competent programmer. Likewise, program listings are unnecessary as such coding is well within the skill of a competent programmer.

Figure 7:
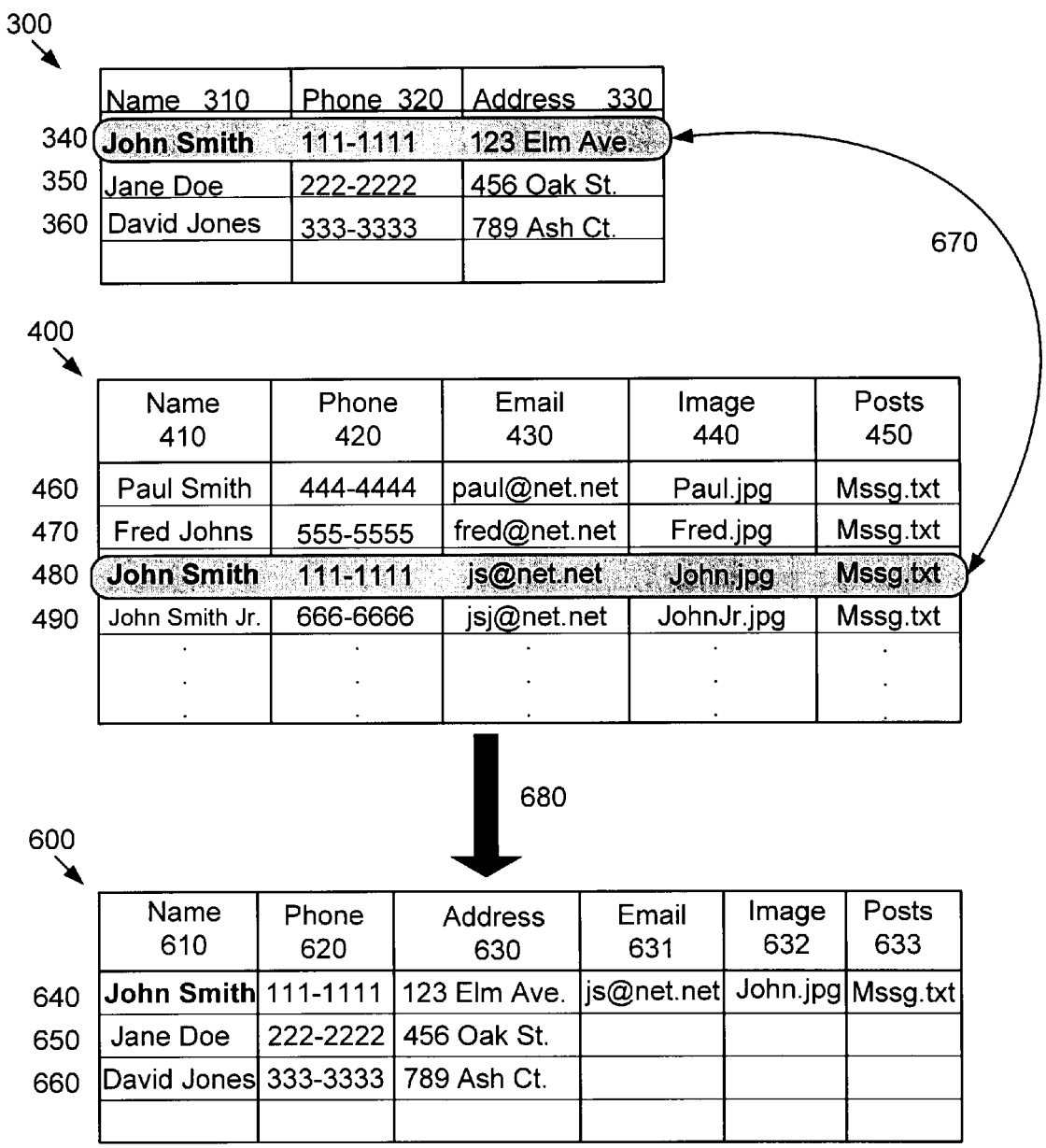
FIG. 7 is a diagram of contact enrichment according to an exemplary embodiment of the present disclosure.

FIG. 7 includes contacts 300 of the mobile device 140 and profiles 400 corresponding to a user account on the social network server 110. Once the user social network account and mobile device 140 are registered in contact enrichment server 100, the contact enrichment server 100 searches the profiles 400 for profiles matching contacts in table 300. In FIG. 6, profile 480, "John Smith," is identified by the contact enrichment server 100 as matching the contact 340 stored on the mobile device 140, as indicated by line 670.

In FIG. 7, the contact enrichment server 100 uses the names 310 of the contacts 300 to search the names 410 of the profiles 400. However, as recognized by one skilled in the art, other criteria as described herein may be used to search for matching profiles. For example, searches may be made by comparing phone numbers, addresses, email addresses, text messages, emails, postings, or any other information known in the art.

Further, to search the profiles 400 in social network server 110, the contact enrichment server 110, may directly access profiles 400 on social network server 110 using a Virtual Private Network (VPN) connection, Secure Sockets Layer (SSL), secure Hypertext transfer protocol (HTTPS). Alternatively, the contact enrichment server 100 may emulate a user, and browse through the web pages of the graphical user interface (GUI) of the social network server 110 to access and search profiles 400. Other methods and protocols for communication between devices may also be used without departing from the scope of the present description.

Once a contact-profile match is identified, the contact enrichment server 100 examines the contact and matching profile to determine whether the matching profile includes information not included in the contact. In FIG. 7, the contact enrichment server 100 may examine contact 340 and profile 480 to determine whether profile 480 includes any information not included in contact 340. If profile 480 does not include any additional information in this case, the contact enrichment server 100 takes no action.

In FIG. 7, profile 480 includes email 430, image 440 and posts 450, which are not included in contact 340. Therefore, the contact enrichment server 100 enriches contact 340 by appending email 430, image 440 and posts 450 from profile 480 to contact 340. Arrow 680 represents the enrichment of contacts 300 in FIG. 7.

Contacts 600 are the contacts 300 stored in mobile device 140 after enrichment by contact enrichment server 100. Contacts 650 and 660 corresponding to contacts 350 and 360 and are unchanged as the contact enrichment server 100 did not find matching profiles in profiles 400. However, contact 640 corresponding to contact 340 now includes email 631, image 632 and posts 633, which have been appended by the contact enrichment server 100 from profile 480.

To enrich contacts 300, the contact enrichment server may store a copy of contacts 300, append matching information to the contacts 300 to generate contacts 600, and then transfer contacts 600 to the mobile device via the client device 120 or directly through link 141. Alternatively, the contact enrichment server 100 may identify information from profiles 400 to be appended to contacts 300, and transmit the identified information to, for example, client device 120. Client device 120 may then transmit the identified information to the mobile device 140, and the mobile device 140 may append the identified information to corresponding contacts in contacts 300. Client device 120 may also store a copy of contacts 300, and may therefore append the identified information to the mobile device 140 to generate contacts 600. Then the client device 120 may transfer contacts 600 to mobile device 140 by any means known in the art, including synchronization.

Profiles 400 are not affected by the contact enrichment described above as contact enrichment server 100 enriches only contacts 300 stored in mobile device 140 and/or contacts 300 stored in client device 120. Therefore, address 330 of contact 340 is not appended to profile 480 despite the match between contact 340 and profile 480. Further, as contact enrichment involves appending information to existing contacts 300, profiles 460, 470 and 490 are not transferred to the mobile device 140 as no corresponding contact was identified among contacts 300.

Figure 8:
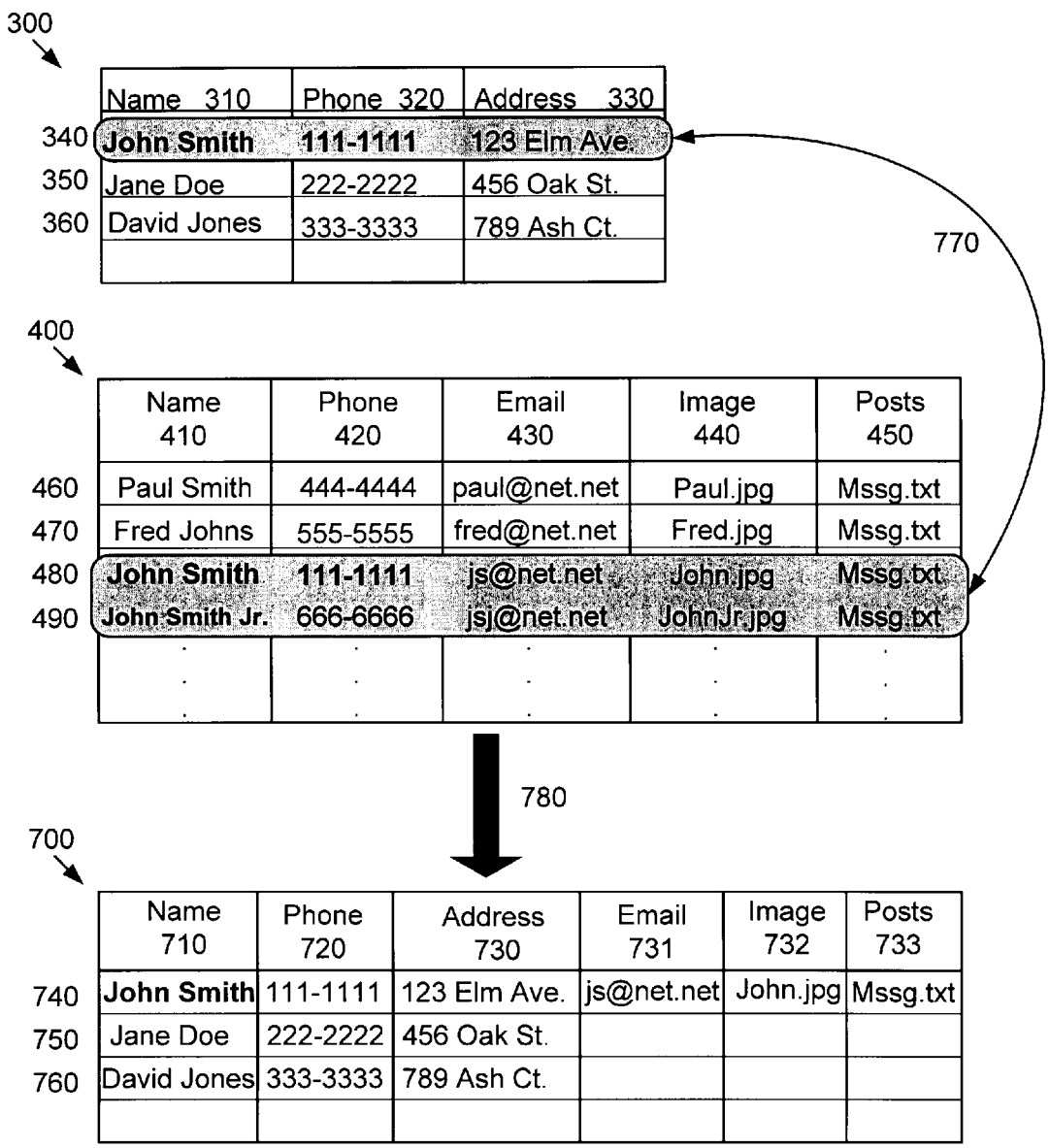
FIG. 8 is diagram of contact enrichment according to another exemplary embodiment of the present disclosure.

FIG. 8 corresponds to another contact enrichment example in which more than one profile 400 on the social network server 110 matches a contact 300 stored on the mobile device 140. The contact enrichment server 100 uses name 310 of contacts 300 to identify corresponding matches in name 410 of profiles 400, and identify profiles 480 and 490 as matching contact 340. When more than one profile is identified as a potential match to a single contact, the contact enrichment server 100 may increase the number of criteria used to identify a match. In FIG. 8, the contact enrichment server 100 may compare name 310 to name 410 and phone 320 to phone 420 to identify profiles 400 matching contacts 300. For example, both profiles 480 and 490 have names that match the name in contact 340. However, only profile 480 has both a name and a phone number that matches the name and phone number of contact 340. Therefore, the contact enrichment server 100 identified profile 480 as a match, and enriches contact 340 to generate contact 740 as described above.

Alternatively, the contact enrichment server 100 may simply substitute one search criteria for another when multiple matching profiles are found. For example, the contact enrichment server 100 may use phone 320 and phone 420 to determine a matching profile rather than name 310 and name 410. The contact enrichment server 100 may also update contact 340 using information from both profiles 480 and 490. Thus, the contact enrichment server 100 may use multiple profiles 400 to update a single one of contacts 300 when the number of matching profiles is less than a predetermined threshold. For example, if the number of matching profiles is less than or equal to five.

When the contact enrichment server 100 enriches a contact using multiple profiles, the contact enrichment server 100 may first compare timestamps from the multiple profiles to determine a most recent profile and enrich the contact using the most recent profile. The contact enrichment server 100 may also compare timestamps of individual data items within the profiles to determine a most recent version of each data item, and then draw from the multiple profiles to enrich the contact with the most recent data items. Other techniques of combining related information may also be used by the contact enrichment server 100 as would be recognized by one skilled in the art.

If, however, the number of matching profiles exceeds the predetermined threshold, the contact enrichment server 100 may refine the search for matching profiles as described above at least until the number of multiple matching profiles drops below the predetermined threshold.

When fields in the contacts 300 do not correspond to fields in the profiles 400, the contact enrichment server 100 may map the contact fields to the profile fields according to a manually specified mapping or using default rules. For example, the contact enrichment server may map a profile field of "mobile" to the phone 320 field of contacts 300. If a profile has both a phone 420 field and a "mobile" filed, the contact enrichment server 100 may map the mobile field to an unused contact field, such as a user defined field. Alternatively, the contact enrichment server 100 may ignore a profile field if a mapping cannot be established or if the corresponding information is incompatible with the mobile device. However, the contact enrichment server 100 may also convert incompatible information into a compatible format or provide a description thereof in the corresponding contact. Other techniques for mapping information may also be used without departing from the scope of the present disclosure.

In the description of contact enrichment given above, a single social network server 110, a single contact enrichment server 100 and a single mobile device 140 are used for simplicity. However, the present advancement is not limited to a single social network server 110, single contact enrichment server 100, and mobile device 140. Rather, multiple social network servers 100, which may or may not be related, and multiple contact enrichment servers 100 may be used in conjunction with the present advancement to update contacts stored on multiple mobile devices 140. Further, the contacts may also be stored on the client device 120, such that the above-described enrichment of contacts is equally applicable to enrichment of contacts on the client device 120.

Moreover, the social network server 110 may also be an email server, message board, file sharing server, private network directory, media exchange host or any other device for facilitating communication, file sharing and storage of profile information that is known in the art.

Figure 9:
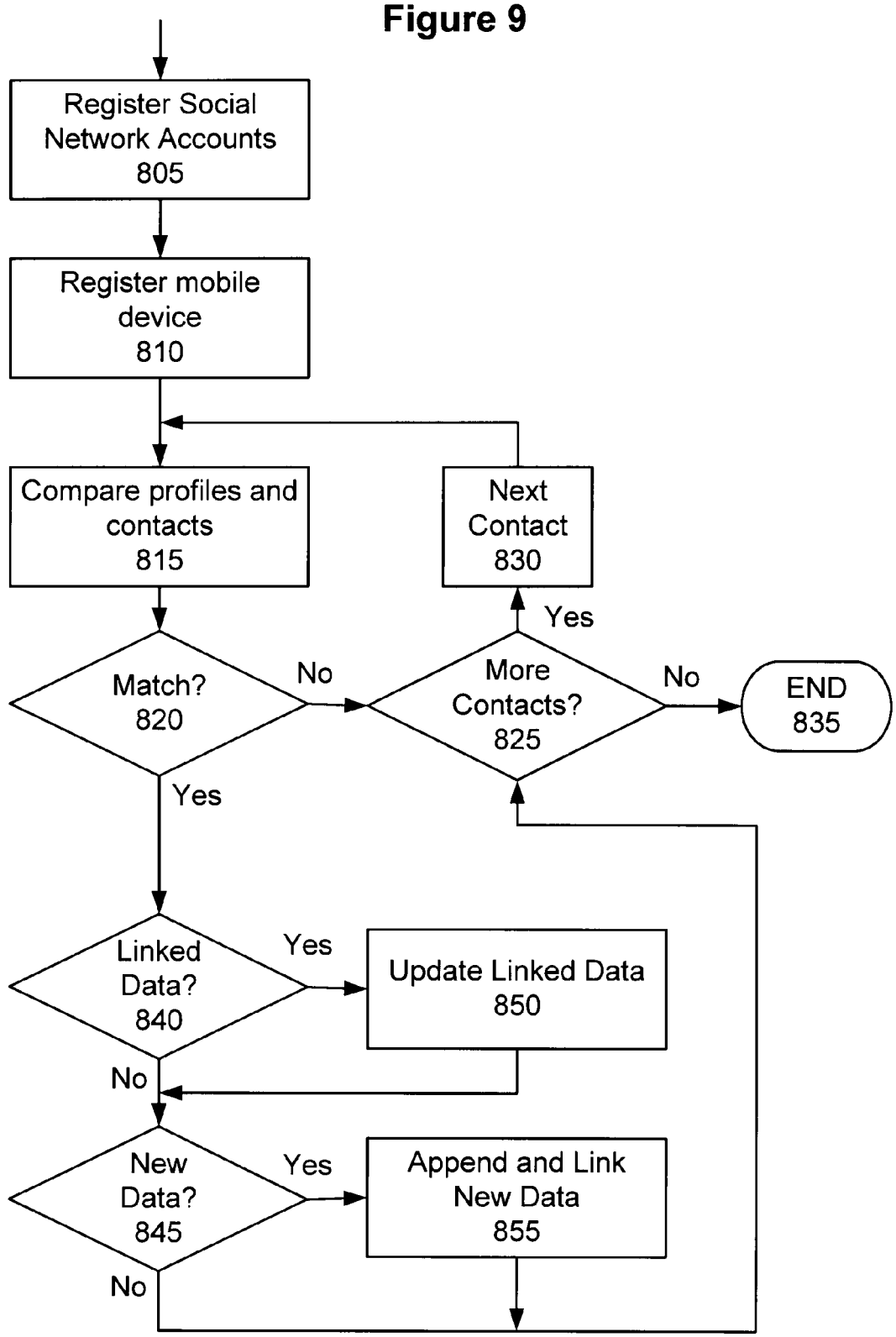
FIG. 9 is an algorithmic flow chart of content enrichment according to an exemplary embodiment of the present disclosure.

Next, a method for contact enrichment of mobile device 140 is described with reference to FIG. 9. In step 805, social networking accounts are registered in the contact enrichment server 100. Specifically, the mobile device 140 or the client device 120 may be used to inform contact enrichment server 100 of user accounts on social network server 110. In this case, an account on social network server 110 includes information corresponding to the owner of the account as well as information regarding other users of the social network server 110, with may be contained in an address book, a list of friends, in groups associated with the account, in messages, and the like. Each account may be publicly viewed or may be restricted to viewing by authorized users. In the case of a restricted account, the contact enrichment server 100 is to be given a password, encryption key, certificate or any other such means of gaining access to the account. Further, registration of an account also involves identifying a network address of the account, including the address of the social network server 100 and an account ID.

At the time of registration, or any time thereafter, specific profiles within the registered accounts may be identified as corresponding to contacts 300, or the contact enrichment server 100 may be instruction to ignore certain profiles.

In step 810 the mobile device 140 storing contacts 300 to be enriched is registered in the contact enrichment server 100. Registration of the mobile device 140 includes uniquely identifying the mobile device 140 to the contact enrichment server 100, and providing any addresses and passwords necessary to gain access to contacts 300. The registration of the mobile device 140 may be performed explicitly by accessing a user interface of the contact enrichment server 100 via the mobile device 140 or client device 120. However, registration of the mobile device 140 may also be done implicitly by downloading appropriate software to the mobile device 140 for interfacing with the contact enrichment server 100. Such software may include without limitation, a web browser, an electronic address book, a personal information management application, and/or a plug-in for any of these software applications.

Once registration of social network accounts and the mobile device 140 is accomplished, the contact enrichment server 100 communicates with the mobile device 140 to determine the contacts 300 stored thereon. Such communication may take place over a cellular network, a WiFi network, a Bluetooth network, or may be performed vial client device 120 by connecting mobile device 140 to the client device 120 using, for example, a USB connection. Other communication implementations are also possible without departing from the scope of the present invention.

The contact enrichment server 100 also contacts social network server 110 to access the social network accounts registered by the user in step 805. By accessing the registered social network accounts, the contact enrichment server 100 may assemble a list of profiles 400 corresponding to the social network accounts. Contact enrichment server 100 may assemble the list by storing copies of the profiles 400 or any portion thereof, such as name 410. A unique identifier assigned by the social network server 110 may also be used by the contact enrichment server 100 to reference profiles 400 and compile the profile list.

In step 815, the contact enrichment server 100 compares the contacts 300 of the mobile device 140 to the profiles 400 of the social network server 110. As discussed above, comparison may include comparing individual fields in both the profiles and the contacts, or multiple fields in both the profiles and the contacts. At step 820, the contact enrichment server determines whether a match exists between a profile on the social network server 110 and the contacts on mobile device 140. If a match exists, the contact enrichment server 100 then determines whether the contact 300 includes any linked data at step 840.

Linked data is data that has been previously appended to contact 300 by the contact enrichment server 100 using one or more of the profiles 400. Thus, contacts 300 may included contacts that have been previously enriched by the contact enrichment server 100 as described above. The linked data is linked to a corresponding source in the profiles 400 by the contact enrichment server 100 to allow for updates of the data. Data update and data linking is described in detail below. If the contact enrichment server 100 determines that the contact 300 includes linked data, the contact enrichment server updates the linked data at step 850.

If no linked data is identified, the contact enrichment server 100 then determines whether the matching profile includes new data at step 845. New data is data from the matching profile that is not included in a corresponding contact. If the matching profile includes new data, the contact enrichment server 100 appends the new data to the corresponding contact and links the new data with the original data on the matching profile at step 855. If the matching profile contains no new data, the contact enrichment server 100 does not update the contact, but instead determines whether additional contacts are stored in the mobile device 140 at step 825. If no additional contacts are stored on mobile device 140 the contact enrichment process ends at step 835.

If additional contacts are stored in the mobile device 140, the contact enrichment server 100 selects the next contact at step 830 and performs the steps 815, 820, 840, 845, 850 and 855 described above. Thus, the contact enrichment server 100 cycles through all contacts 300 stored in the mobile device 140 to determine whether any corresponding matching profiles exist on social network server 110, and enriches any contacts for with matching profiles are determined.

Figure 10:
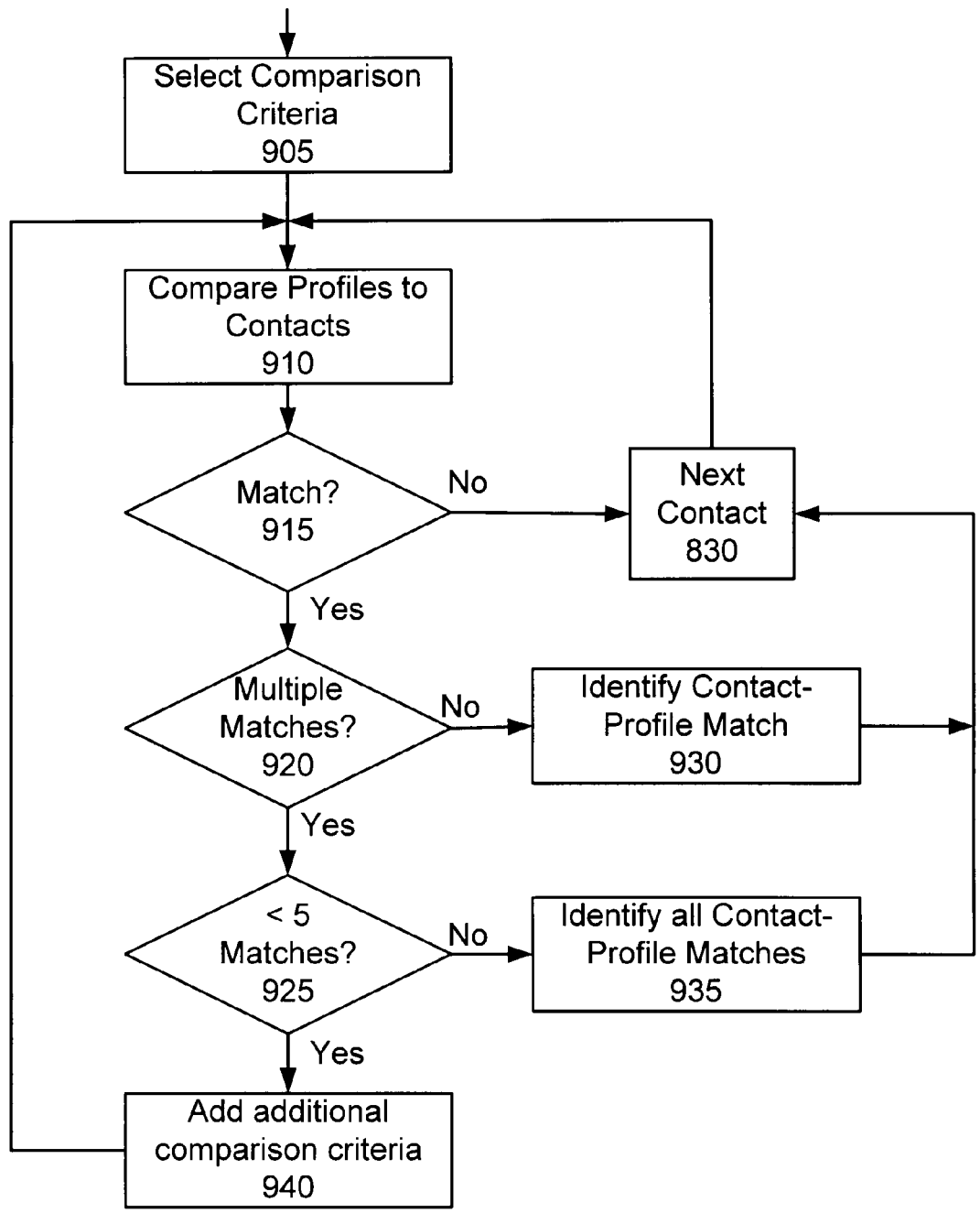
FIG. 10 is an algorithmic flow chart of contact-profile matching according to an exemplary embodiment of the present disclosure.

FIG. 10 is a flow chart of the process for selecting a matching profile. At step 905 the comparison criteria is selected. For example, the comparison criteria may be manually selected during configuration of the contact enrichment server 100 through client device 120 or mobile device 140. Alternatively, a default search criteria may be used. As discussed above search criteria may include names, phones, addresses, email addresses, images, videos, messages, IM ID's and/or any combination thereof Other search criteria, such as freeform test searches are also possible. The predetermined threshold for multiple matching profiles may also be set during configuration of the contact enrichment server 100, or a default value may be assumed.

Once the comparison criteria is selected, the process moves to step 910 where the contacts 300 on the mobile device 140 and profiles 400 on the social network server 110 are compared as described above. If a match is determined at step 915 the process proceeds to step 920 where it is determined whether multiple matching profiles exist. If no multiple matching profiles exist, the contact and its matching profile in the social network server 110 are identified so that the contact enrichment server 100 may enrich the contact.

In this context a match is determined when comparable information fields store identical data. For example, if both a name field of a contact and a name field of a profile store the name "john" a match may be determined. Alternatively, a match may be determined if both fields include the identical data. For example, if one name field stores "john smith" and the other name filed simply stores "john".

Matching, however, does not require identical information. Matches may be determined for similar information whose degree of similarity (i.e. how close the information comes to being identical) is above a predetermined threshold, or matching may be determined when a profile and contact have information in common in multiple fields. Additionally, the fields may be weighted to emphasize the importance of similarity in certain fields while de-emphasizing the importance of similarity in others. Any other matching techniques and/or techniques for quantifying a degree of similarity known in the art may also be used without departing from the scope of the present disclosure.

When multiple matching profiles are identified at step 920, the contact enrichment server proceeds to step 925 where it determines whether the number of matching profiles exceeds a predetermined threshold, for example 5. As discussed above, a threshold of five has been arbitrarily chosen to provide a concrete example of the functionality of the present advancement, but in no way should this number be interpreted as limiting upon the present advancement. Other thresholds are equally possible. For example, the contact enrichment server may determine that if ten or fewer matching profiles exist the contact will be enriched with information from all of the matching profiles, or the contact enrichment server may determine that if two or more matching profiles exist the search will need refining before the contact may be enriched.

If, in FIG. 10, it is determined that more than five matching profiles exist at step 925, the process proceeds to step 940 where additional comparison criteria is added to the search. For example, in addition to searching by name, the contact enrichment server 100 may search by name and phone number or by name and email address, or by name and postal address. Further, the contact enrichment server may add additional criteria and therefore search by name, email address and phone number or by name, email address and postal address, or any other combination of search criteria. Alternatively, the contact enrichment server 100 may substitute a name search for a phone number search or an email address search, as one of ordinary skill in the art will recognize. Once the additional comparison criteria is established at step 940, the process returns to step 910 where the contact and profiles are again compared.

Returning to step 915, if no matching profiles are determined the process moves to step 830 where a next contact is chosen for comparison. Likewise in step 925, if the number of matching profiles is fewer than the predetermined threshold, the contact and corresponding matching profiles are identified so that the contact enrichment server 100 may enrich the contact with information from all matching profiles.

Further, though the above process has been described as sequential, other implementations are possible. For example, the contact enrichment server 100 may compare all contacts will all profiles simultaneously. The contact enrichment server may also compare multiple criteria from each contact with corresponding criteria in each profile simultaneously.

Alternatively, the contact enrichment server may sequentially compare one contact after the other or may compare one criteria after another. Any other search methods known in the art are also equally applicable with the present invention.

Once a contact and matching profiles are identified, the contact enrichment server 100 enriches the contact by appending information from the matching profile to the contact. In this case, appending information may be performed by copying the contact to the contact enrichment server 100, appending the information on the copy of the contact in the contact enrichment server and then transmitting the enriched contact to the mobile device 140. Alternatively, all contacts from the mobile device 140 may be uploaded to the contact enrichment server 100, where they are each enriched as discussed above. Then, the enriched contacts may be transmitted back to the mobile device 140. Additionally, the above-described process is equally applicable to the client device 120 and any contacts stored therein. Thus, the contacts stored on the mobile device 140 may be transmitted to the client device 120 via, for example, link 142, and the contact enrichment server may enrich the contacts on the client device 120. After enrichment, the contacts on the client device 120 may then be transferred back to the mobile device 140.

After the contact enrichment server 100 enriches a contact, the information appended to the contact is linked to the original information in the matching profile. Specifically, the contact enrichment server stores a contact ID 1010 and contact path 1020 in a link table 1000 together with the corresponding profile ID 1040 and corresponding profile path 1050. (See FIG. 10). Thus, the contact enrichment server 100 may keep track of the sources used to enrich a given contact. The contact enrichment server 100 may also include additional data in the enriched contact identifying a source of the appended data in lieu of the link table 1000, and other methods of linking data are also possible as will be recognized by one of skill in the art.

Figures 11, 12:
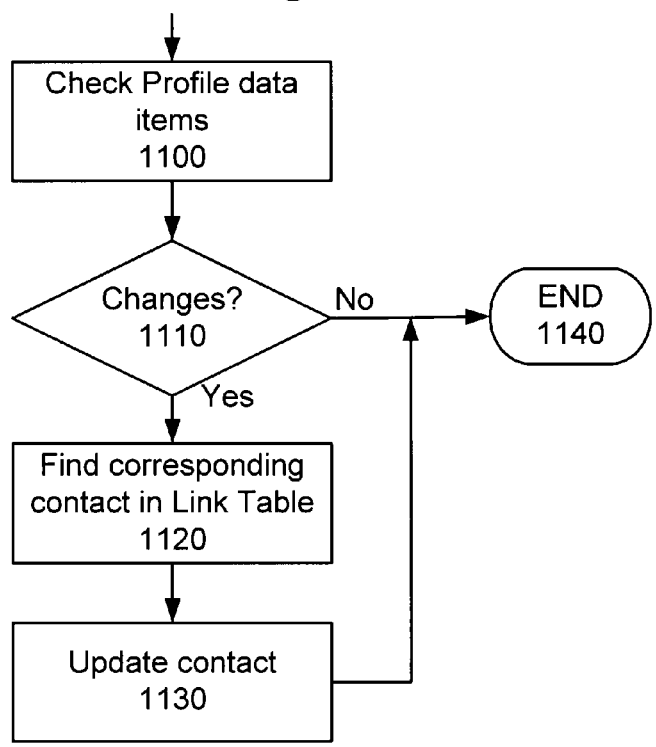
FIG. 11 is a link table according to an exemplary embodiment of the present disclosure.
FIG. 12 is an algorithmic flow chart of link data update according to an exemplary embodiment of the present disclosure.

In FIG. 12, the process of updating linked data (i.e., data appended to a contact by the contact enrichment server 100) is described. In FIG. 12, the process begins by checking profile items corresponding to the linked data in step 1100. For example, in FIG. 6, contact 640 is enriched with email address 631 from profile 480. Thus, link table 1000 includes an entry 1060 with a contact ID 1010 of John Smith and a contact path of mobile 140 which is linked to a profile ID 1040 of js@net.net and a profile path 1050 of a URL corresponding to the social network server 110. If the email 430 of profile 480 changes, the contact enrichment server 100 identifies this change at step 1110. Then the contact enrichment server 100 proceeds to step 1120 where the contact enrichment server 100 uses link table 1000 to identify, for example, contact 340 as corresponding to profile 480. In step 1130 the profile 640 is updated with the changed information corresponding to email 631. Thus, the contact enrichment server 100 not only enriches contacts by appending new information to the contacts, the contact enrichment server also maintains the appended information current.

Though the above process has been described with respect to updating contact information, such as email, phone numbers, addresses, images and the like, other information may also be updated using the present advancement. For example, messages on the social network server 110 may be updated using the above described method. A message posted to a group listed in a registers used account may be appended to a contact in the user device 140 as described above. Also, a message originated from a matching profile or directed to a matching profile may also be appended to a corresponding contact on mobile device 140.

Figure 13:
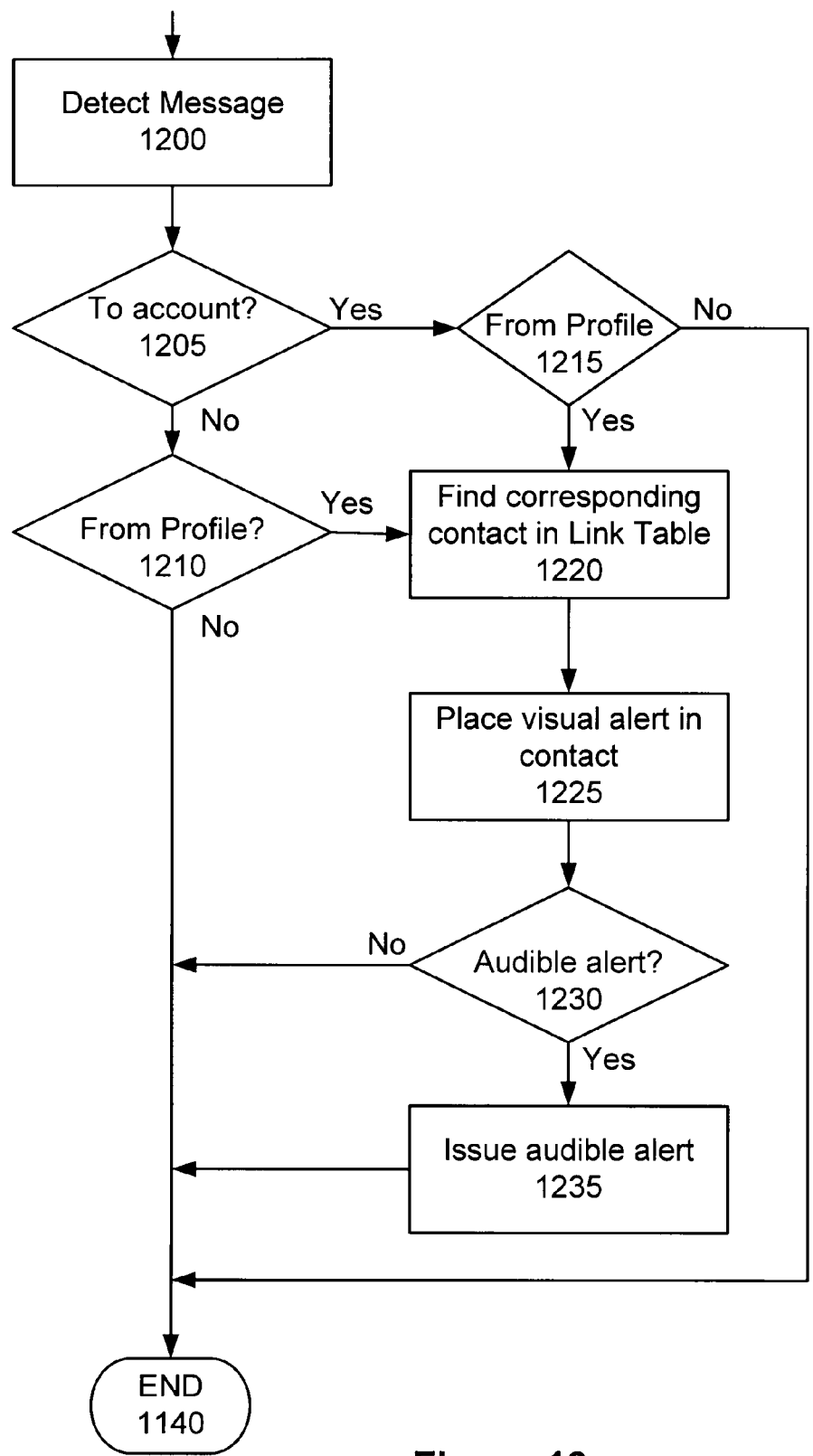
FIG. 13 is an algorithmic flow chart of alert issuance according to an exemplary embodiment of the present disclosure.

When enriching contacts with messages, it may be desirable to indicate new messages with a visual and/or audible alert at the mobile device 140. FIG. 13 is a flow chart for issuing an alert when a message has been appended to a contact on mobile device 140 using the method described above. In FIG. 12, a message is detected at step 1200. At step 1205 it is determined whether the message is directed to a registered social network account or any of the profiles 400. If the message is directed to a registered account, an originator of the message is determined at step 1215. If the originator of the message is not one of the profiles 400, the process ends at step 1140 without issuing an alert. If the originator of the message is one of the profiles 400, a corresponding contact in mobile device 140 is identified using link table 1000 in step 1220. At step 1225 a visual alert is associated with the contact on mobile device 140. Such visual alert may include changing the font color, size, or boldness corresponding to the contact, adding a check, dot or other glyph to signify that a message has been received, or any other such visual cues as known in the art.

In step 1230 the audible alert settings are determined. If an audible alert should be issued, alert is issued at step 1235. The audible alert may also include vibrating the mobile device 140. If no audible alert should be issued then the process ends at step 1140 after placing the visual alert in the corresponding contact.

Returning to step 1210, if the detected message is not directed to the registered account, but is originated from a profile associated with the registered account, such as a profile in a friend list or group, the method proceeds through steps 1220, 1225, 1230 and possibly 1235 as described above. If, however, the detected message is not issued to the registered account or originates from an associated profile, then the process merely ends at step 1140.

Further, the alerts issued by mobile device 140 are entirely configurable. For example, audible alerts may be configured to only issue when a message originates on a friend list of a registered account. Audible and/or visual alerts may also issue when a profile on the friend list receives a message from another profile on the friend list or another profile not on the friend list. Alternatively, audible and/or visual alerts may be entirely disabled.

Additionally, the message itself may be transmitted to the mobile device 140 or the visual/audible alert may be issued without transmission of the message to the mobile device 140. Thus, retrieval of the message may be performed in a separate operation or may be part of the alert issuing process described above. In this context a message may be a text message, such as an email or IM message, or may be an image, video or audio file being shared by the originator of the message.

Additional variations on the above described system, apparatus and method are also possible. For example, though the social network server 110 is described as a social networking server that allows communication via message boards, posts, email, instant messaging and the like, social network server 110 may also be a web mail server, a blog server, or any other server and/or website used for communication as known in the art.

Moreover, if the contact enrichment server 100 incorrectly enriches a contact, the incorrect content may be deleted by accessing the contact enrichment server 100 through client device 120 or mobile device 140. Any such deleted content will not be appended by the contact enrichment server 100 in the future, and any link to a corresponding profile is removed from the link table 100.

In addition, a user may compile a profile on the contact enrichment server 100, which the user may or may not indicate as being public. If the user indicates the profile as being public, other users, or the contact enrichment server 100, may search the user's profile for contact and/or profile information. However, if the user identifies the profile as private, the profile is hidden from other users, and the contact enrichment server 100 must explicitly be granted access.

Profiles 400 also need not reside in a single social network server 110. Instead, profiles 400 may reside in multiple social network servers 110 that may or may not be related. Preferably, contact enrichment server 100 may draw from a large number of profiles 400 distributed across many social network servers 100 to enrich all contacts 300 stored in the mobile device 140 or the client device 120. When multiple matching profiles are identified, the contact enrichment server 100 preferably checks timestamp information across all of the social network servers 100.

In another aspect of the present disclosure, a history of information appended by the contact enrichment server 100 may be viewable in association with the contacts 300. For example, read and unread messages, message alerts, images, video, audio, etc., may be identified in each contact 300 and may be directly accessible by viewing the contact in the address book or other organizing application installed on the mobile device 140.

Moreover, any processes, descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art. Though the contact enrichment server 100 is described above as searching social network server 110, or any variation thereof, the contact enrichment server may also search other mobile devices 140 and/or client devices 120 for profile and/or contact information with which to enrich contacts on a mobile device.

Obviously, numerous modifications and variations of the present invention are possible in light of the above teachings. It is therefore to be understood that within the scope of the appended claims, the invention may be practiced otherwise than as specifically described herein.

The invention claimed is:

1. A contact enrichment server, comprising:
   a non-transitory data store comprising executable software and one or more links, each link identifying a correspondence between a profile on a social network server and a contact on a mobile device;
   a communication module configured to communicate with a first mobile device and a first social network server via one or more data connections;
   a processor in data communication with the data store and the communication module, wherein the processor is configured to execute the software and cause the contact enrichment server to:
      detect a new message on the first social network server;
      identify, based on the new message, a first profile on the first social network server associated with a sender of the new message;
      identify, based on the first profile, a first link in the data store, the first link identifying a correspondence between the first profile and a linked contact on the first mobile device associated with the sender of the new message;
      transmit alert data to the first mobile device, wherein the alert data is configured to cause a first alert associated with the linked contact to be presented on the first mobile device, the first alert indicating that the new message from the linked contact has been received at the first social network server;
      identify, based on the new message, a second profile on a second social network server associated with the sender of the new message;
      compare first timestamp data associated with the first profile with second timestamp data associated with the second profile; and
      append profile information to the linked contact from one of the first or the second profile having a most recent timestamp.

2. The contact enrichment server according to claim 1, wherein the processor is configured to execute the software and further cause the contact enrichment server to: append profile information from the first profile to the linked contact.

3. The contact enrichment server according to claim 2, wherein the profile information from the first profile includes at least one of a photo, a video, a phone number, an email address, a postal address, a message or a calendar event.

4. The contact enrichment server according to claim 1, wherein the processor is configured to execute the software and further cause the contact enrichment server to:
   append profile information from the second profile to the linked contact.

5. The contact enrichment server according to claim 4, wherein the profile information from the second profile includes at least one of a photo, a video, a phone number, an email address, a postal address, a message or a calendar event.

6. The contact enrichment server according to claim 1, wherein the profile information includes at least one of a photo, a video, a phone number, an email address, a postal address, a message or a calendar event.

7. The contact enrichment server according to claim 1, wherein the first alert is a visual alert.

8. The contact enrichment server according to claim 7, wherein the alert data is further configured to cause a second alert associated with the linked contact to be presented on the first mobile device, the second alert indicating that the new message from the linked contact has been received at the first social network server, and wherein the second alert is an audible alert.

9. The contact enrichment server according to claim 7, wherein the visual alert comprises at least one of: a change in font color associated with the linked contact, a change in font size associated with the linked contact, a change in font boldness associated the linked contact, a check glyph associated with the linked contact, or a dot glyph associated with the linked contact.

10. The contact enrichment server according to claim 1, wherein the data store further comprises registration data, the registration data indicating one or more social network servers associated with the first mobile device.

11. The contact enrichment server according to claim 1, wherein the processor is configured to execute the software and further cause the contact enrichment server to:
   transmit the alert data to a second mobile device,
   wherein the alert data is configured to cause a second alert associated with the linked contact to be presented on the second mobile device, the second alert indicating that the new message from the linked contact has been received at the first social network server.

12. The contact enrichment server according to claim 1, wherein the new message on the first social network server is intended for a user of the first mobile device.

13. The contact enrichment server according to claim 1, wherein the new message comprises one of an e-mail message, an instant message, an image file, a video file, or an audio file.

14. A non-transitory, computer-readable medium comprising computer-executable instructions, the computer-executable instructions which, when executed by a processor, cause a computing device to perform a method, the method comprising:
   detecting a new message on a first social network server;
   identifying, based on the new message, a first profile on the first social network server associated with a sender of the new message;
   identifying, based on the first profile, a first link in a data store, the first link identifying a correspondence between the first profile and a linked contact on a first mobile device associated with the sender of the new message;
   transmitting alert data to the first mobile device, wherein the alert data is configured to cause a first alert associated with the linked contact to be presented on the first mobile device, the first alert indicating that the new message from the linked contact has been received at the first social network server;
   identifying, based on the new message, a second profile on a second social network server associated with the sender of the new message;
   comparing first timestamp data associated with the first profile with second timestamp data associated with the second profile; and
   appending profile information to the linked contact from one of the first or the second profile having a most recent timestamp.

15. The non-transitory, computer-readable medium comprising computer-executable instructions of claim 14, the computer-executable instructions which, when executed by the processor, cause the computing device to perform a method further comprising: appending profile information from the first profile to the linked contact.

16. The non-transitory, computer-readable medium comprising computer-executable instructions of claim 15, wherein the profile information from the first profile includes at least one of a photo, a video, a phone number, an email address, a postal address, a message or a calendar event.

17. The non-transitory, computer-readable medium comprising computer-executable instructions of claim 14, the computer-executable instructions which, when executed by the processor, cause the computing device to perform a method further comprising:
   appending profile information from the second profile to the linked contact.

18. The non-transitory, computer-readable medium comprising computer-executable instructions of claim 17, wherein the profile information from the second profile includes at least one of a photo, a video, a phone number, an email address, a postal address, a message or a calendar event.

19. The non-transitory, computer-readable medium comprising computer-executable instructions of claim 14, wherein the profile information includes at least one of a photo, a video, a phone number, an email address, a postal address, a message or a calendar event.

20. The non-transitory, computer-readable medium comprising computer-executable instructions of claim 14, wherein the first alert is a visual alert.

21. The non-transitory, computer-readable medium comprising computer-executable instructions of claim 20,
   wherein the alert data is further configured to cause a second alert associated with the linked contact to be presented on the first mobile device, the second alert indicating that the new message from the linked contact has been received at the first social network server, and
   wherein the second alert is an audible alert.

22. The non-transitory, computer-readable medium comprising computer-executable instructions of claim 20, wherein the visual alert comprises at least one of: a change in font color associated with the linked contact, a change in font size associated with the linked contact, a change in font boldness associated the linked contact, a check glyph associated with the linked contact, or a dot glyph associated with the linked contact.

23. The non-transitory, computer-readable medium comprising computer-executable instructions of claim 14, wherein the data store further comprises registration data, the registration data indicating one or more social network servers associated with the first mobile device.

24. The non-transitory, computer-readable medium comprising computer-executable instructions of claim 14, the computer-executable instructions which, when executed by the processor, cause the computing device to perform a method further comprising:
   transmit the alert data to a second mobile device,
   wherein the alert data is configured to cause a second alert associated with the linked contact to be presented on the second mobile device, the second alert indicating that the new message from the linked contact has been received at the first social network server.

25. The non-transitory, computer-readable medium comprising computer-executable instructions of claim 14, wherein the new message on the first social network server is intended for a user of the first mobile device.

26. The non-transitory, computer-readable medium comprising computer-executable instructions of claim 14, wherein the new message comprises one of an e-mail message, an instant message, an image file, a video file, or an audio file.

27. A method of enriching contacts using a contact enrichment server comprising a data store, the method comprising:
   detecting a new message on a first social network server;
   identifying, based on the new message, a first profile on the first social network server associated with a sender of the new message;
   identifying, based on the first profile, a first link in the data store, the first link identifying a correspondence between the first profile and a linked contact on a first mobile device associated with the sender of the new message;
   transmitting alert data to the first mobile device, wherein the alert data is configured to cause a first alert associated with the linked contact to be presented on the first mobile device, the first alert indicating that the new message from the linked contact has been received at the first social network server;
   identifying, based on the new message, a second profile on a second social network server associated with the sender of the new message;
   comparing first timestamp data associated with the first profile with second timestamp data associated with the second profile; and appending profile information to the linked contact from one of the first or the second profile having a most recent timestamp.

* * * * *